United States Patent [19]

Mikkelsen et al.

[11] Patent Number: 4,896,748

[45] Date of Patent: Jan. 30, 1990

[54] FULL FREE LIFT MAST ASSEMBLY

[75] Inventors: Jan Mikkelsen, Borre; Kjell Sorlie, Tonsberg, both of Norway

[73] Assignee: Caterpillar Industrial Inc., Mentor, Ohio

[21] Appl. No.: 199,543

[22] Filed: May 27, 1988

[51] Int. Cl.⁴ .................... B66B 9/20

[52] U.S. Cl. .................... 187/9 E; 91/533; 91/535; 92/117 A; 187/17

[58] Field of Search .................... 187/9 E, 9 R, 17, 68; 414/629, 631, 641; 254/93 R; 92/146, 164, 117 A, 61, 148; 91/533, 535

[56] References Cited

U.S. PATENT DOCUMENTS

| | | | |
|---|---|---|---|
| 2,518,251 | 8/1950 | Quayle et al. . | |
| 2,670,811 | 3/1954 | Shaffer | 187/9 E |
| 2,821,264 | 1/1958 | Ulinski | 187/9 |
| 2,925,887 | 2/1960 | Gibson | 187/9 E |
| 2,973,835 | 3/1961 | Quayle | 187/9 E |
| 3,144,086 | 8/1964 | Kurt et al. | 92/146 X |
| 3,208,556 | 9/1965 | Shaffer . | |
| 3,485,323 | 12/1969 | Ulinski | 92/61 |
| 3,489,249 | 1/1970 | Stammen | 187/9 E |
| 4,018,307 | 4/1977 | Ehrhardt et al. . | |
| 4,244,449 | 1/1981 | Renk et al. | 187/9 E |
| 4,294,572 | 10/1981 | Pattison | 414/641 |
| 4,336,840 | 6/1982 | Bailey | 92/117 A X |
| 4,356,893 | 11/1982 | Johannson | 187/9 E |
| 4,363,380 | 12/1982 | Reud et al. | 187/17 |
| 4,467,894 | 8/1984 | Sinclair | 187/17 |
| 4,585,093 | 4/1986 | Barday, Jr. | 92/61 X |
| 4,593,791 | 6/1986 | Mathews . | |
| 4,683,988 | 8/1987 | Shrum, Jr. | 187/9 E |

FOREIGN PATENT DOCUMENTS

| | | | |
|---|---|---|---|
| 2713808 | 10/1978 | Fed. Rep. of Germany . | |
| 2726246 | 12/1978 | Fed. Rep. of Germany | 187/9 E |

*Primary Examiner*—Joseph J. Rolla
*Assistant Examiner*—Stephen B. Parker
*Attorney, Agent, or Firm*—Alan J. Hickman

[57] ABSTRACT

A full free lift mast assembly having a first pair of spaced apart uprights, a second pair of spaced apart uprights mounted on the first pair of uprights and elevationally movable therealong and a carriage mounted on the second pair of uprights is provided. A first mast lift jack is connected between the first and second pairs of spaced apart uprights, and first and second interconnected carriage lift jacks are pivotally connected to and between the second pair of spaced apart uprights and the carriage. A first connecting arrangement connects a cylinder of the first and second carriage lift jacks and maintains the first and second carriage lift jacks parallel, in a preselected overlapping relationship relative to each other. Therefore, bending of the carriage lift jacks, fluid leakage, missequencing and the like have been substantially reduced. The full free lift mast assembly is particularly suited for use on a material handling vehicle.

9 Claims, 7 Drawing Sheets

FULL FREE LIFT MAST ASSEMBLY

TECHNICAL FIELD

This invention relates to a full free lift mast assembly having first and second carriage lift jacks and a first mast lift jack, and more particularly to a full free lift mast assembly having first and second pairs of uprights, a carriage movably mounted on the second pair of uprights, first and second carriage lift jacks connected between the second pair of uprights and the carriage, a connecting arrangement for connecting the first and second carriage lift jacks to each other, and a mast lift jack connected between the first and second pair of uprights.

BACKGROUND

Lift mast assemblies typically have a first pair of spaced apart uprights which are pivotally mounted to one end of a material handling vehicle and a second pair of spaced apart uprights which are mounted on the first pair of uprights and guided by the first pair of uprights for extensible movement relative thereto. Typically, such lift mast assemblies have a carriage which is mounted on the second pair of uprights and elevationally movable therealong for lifting a load. Lift mast assemblies of this type normally have a plurality of lift chains which transfer motion from a mast lift jack to the carriage and elevationally move the carriage relative to the movable uprights. Several problems are associated with the use of lift chains. One problem in particular relates to obstruction of operator visibility caused by the existence of the lift chains within a window established by the space between the second pair of uprights. This tends to clutter the area between the uprights and reduce the size of the window and operator's visibility.

Chains of the type used in lift mast assemblies are normally provided in pairs. These chains cooperate with a carriage lift jack or mast lift jack to elevationally move the carriage along the second pair of uprights and the mast along the first pair of uprights. The chains have a tendency to become unevenly adjusted in length as normal wear of the chain and cooperating component parts occur. This wear is usually a result of chain loading and the considerable number of operational cycles the chain must endure during normal operation. This uneven adjustment in the chains will result in cocking of the carriage and/or second pair of uprights relative to the uprights upon which it rides and cause undesirable side loading of the carriage, uprights, jacks and associated componentry. This will increase the potential for premature wear of the uprights (flaking galling and the like), premature wear of carriage and upright rollers and other loaded componentry, and reduced chain life. Also, improper chain adjustment during assembly or repair of the lift mast assembly can cause uneven length in the pairs of chains which will result in reduced life of the chains and associated carriage, upright and lift mast componentry indicated above.

Cocking of the carriage, due to uneven chain length, will also cause greater frictional forces to occur at the carriage rollers. This will increase the amount of horsepower required to elevate the carriage and reduce the efficiency of operation of the lift system. Excessive carriage cocking will make it difficult for the operator to align the forks mounted on the carriage with the load to be lifted. During lifting of the load, the cocking of the carriage will cause the load to be at an angle of inclination in a direction traverse the pair of uprights. The added weight of the load on the carriage will serve to increase carriage side loading and premature wear and failure of the associated componentry.

In order to achieve full free lift, that is elevational movement of the carriage from the fully lowered position adjacent a lower end of the second pair of uprights (movable) to a fully raised position adjacent the upper end of the second pair of uprights, an additional lift jack (a carriage lift jack) which is mounted on the on the second pair of uprights is required. This carriage lift jack cooperates with the lift chains to cause the lift chains to move at a ratio of two to one and move the carriage along the second pair of uprights without requiring any of the extension of the second pair of uprights relative to the first pair of uprights. This is important especially in areas wherein overhead clearances are low and elevation of the carriage assembly without elevation of the movable uprights is a necessity. This, of course, clutters up the lift mast assembly between the spaced apart second pair of uprights (window) and further reduces visibility of the vehicle operator.

One attempt to solve the above noted problems is disclosed in U.S. Pat. No. 4,356,893 dated Nov. 2, 1982 to Richard J. Johannson. This patent discloses a lift mast assembly in which lift chains are eliminated by providing a single pair of spaced apart carriage lift jacks. This however, is only a partial solution to the problem in that only partial free lift is provided and not full free lift of the carriage. Through a reading of the specification and inspection of the drawings of the '893 patent, we can see that the stroke length of the carriage lift jacks would be enough to only raise the carriage equal to that distance and no more. Therefore, the maximum amount of carriage lift is equal to only one half the length of the second pair of inner uprights (movable). Therefore, only partial free lift is provided.

The '893 patent discloses the use of a mast lift jack with a ported rod for delivering pressurized fluid flow to the carriage lift jacks. Leakage fluid passing from the rod end of the carriage lift jacks to the head end of the carriage lift jacks would result in impaired operation of the carriage lift jacks and eventual uneven operation. If leakage past the piston should continue over a prolonged period of time and not be able to escape, the operation of the jack will diminish to the point where the stroke length will be drastically reduced. Thus, the free lift of the carriage will be reduced an equal amount. As the amount of leakage in the carriage lift jacks differ, the carriage, which is guided by rollers on the second pair of uprights, will become cocked which will cause adverse side loading and premature ware of the uprights, carriage and the like in the same manner as discussed above. This cocking will also cause difficulty in alignment of the carriage mounted forks with the load to be lifted, as discussed above. Therefore, it is necessary to eliminate uneven carriage lift jack operation caused by fluid leakage.

In applications where one or more jacks (carriage, upright) are provided for each of the moveable elements (carriage, second pair of uprights, etc.) sequencing of operation of the lift jacks often gets out of order. As a result the second pair of uprights may move before the carriage which causes overhead clearance problems and defeats the primary purpose of the full free lift provision. Attempts to solve this problem by the use of sequence valves and the like have resulted in limited success. However, cost, complexity and reliability of such systems result in infrequent use. Therefore a simple, economical, and reliable solution to the problem is needed.

In summary, it is desirable to provide a lift mast assembly wherein full free lift is obtained without the need for carriage lift chains and the like, and one in which the solution eliminates the problems of unequal jack operation, reduced free lift, improper carriage lift jack and upright lift jack sequencing, and premature wear of the carriage lift jack, the carriage, the lift mast uprights and associated components.

DISCLOSURE OF THE INVENTION

In one aspect of the present invention, a full free lift mast assembly having first and second spaced apart uprights and a carriage movably mounted on the second pair of uprights is provided. A first mast lift jack having a cylinder and a rod connected to an extensively movable relative to the cylinder has the rod connected to one of the first pair of fixed and movable uprights and the cylinder connected to the other of the first pair of fixed and movable uprights. A first carriage lift jack having a longitudinal axis, a cylinder, and a rod connected to an extensibly movable along the longitudinal axis and relative to the first carriage lift jack cylinder is pivotally connected at the first carriage lift jack rod to one of the carriage and second pair of uprights. A second carriage lift jack having a cylinder, a longitudinal axis and a rod connected to an extensively movable relative to the second carriage lift jack cylinder is provided. The second lift jack rod is pivotally connected to the other end of the carriage and the second uprights. A first means is provided for connecting the first carriage lift jack cylinder to the second carriage lift jack cylinder and for maintaining the first and second carriage lift jack cylinders from movement relative to each other and for maintaining the longitudinal axis of the first and second carriage lift jacks substantially parallel to each other.

The full free lift mast assembly of the subject invention provides a unique solution to the problem of full free lift by utilizing a pair of carriage lift jacks in an overlapping fashion so that full free lift may be achieved. The first connecting means enables a pair of carriage lift jacks (first and second carriage lift jacks) to be utilized by maintaining the first and second carriage lift jacks from movement relative to each other and the longitudinal axis of the first and second carriage lift jacks parallel to each other. Thus, bending, relative movement, and the like of the first and second carriage lift cylinders is reduced to a minimum which enables the first and second carriage lift cylinders to be used.

Since the combined extended length of the overlapped first and second carriage lift jacks is of a magnitude sufficient to move the carriage to a location adjacent a lower end portion of the second pair of uprights and to a location adjacent the upper end portion of the second pair of uprights the problem associated with the inability of prior chainless lift masts from achieving full free lift is overcome.

Since means is provided for interconnecting the rod end portions of the first and second carriage lift jacks to each other and for passing the leakage fluid from the rod end portions of the first and second carriage lift jacks to said reservoir, the problems associated with fluid being trapped in the head end portions of each of the first and second lift jacks have been overcome.

BEST MODE FOR CARRYING OUT THE INVENTION

Figure 1:
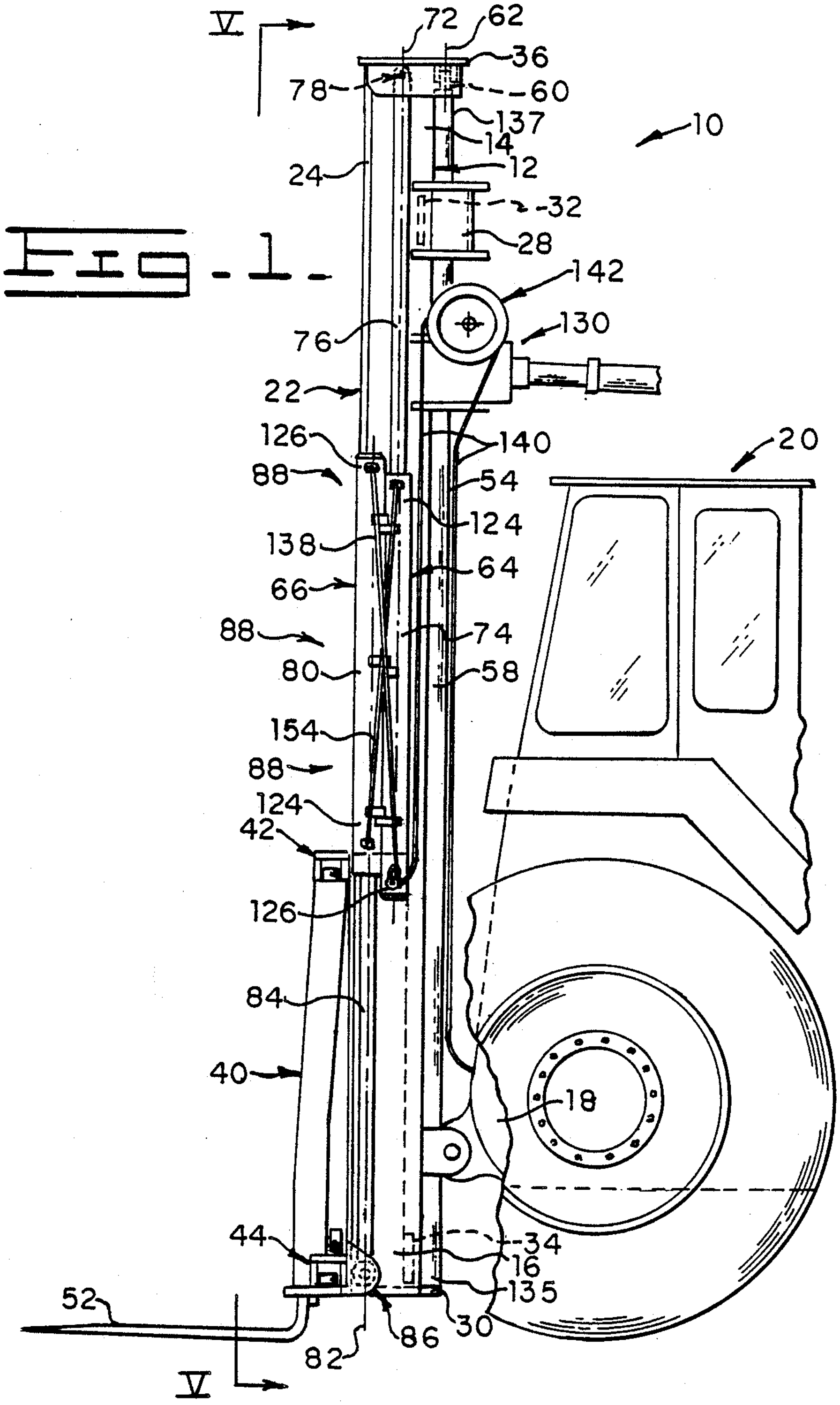
FIG. 1 is a diagrammatic side elevational view of a lift truck having an embodiment of a full free lift mast assembly of the present invention pivotally mounted thereon.

With reference to the drawings, and particularly FIGS. 1-6, a lift mast assembly 10 has a first pair of spaced apart uprights 12 having upper and lower end portions 14,16 which are pivotally connected at the lower end portion 16 to the front end portion 18 of the lift truck 20. The lift mast assembly 10 also has a second pair of spaced apart uprights 22 which are mounted on the first pair of spaced apart uprights 12 and guided by the first pair of spaced uprights 12 for elevational movement between extended and retracted positions relative to the first pair of spaced apart uprights 2. The second pair of spaced apart uprights 22 are nested between the first pair of spaced apart uprights 12. The second pair of spaced apart uprights 22 each have upper and lower end portions 24 and 26. The upper end portion 14 of the first pair of spaced apart uprights are connected together by a cross tie member 28 and the lower end portion 16 of the first pair of spaced apart uprights 12 are connected by a lower cross tie member 30. The first pair of spaced apart uprights 12 are maintained by the upper and lower cross tie members 28,30 parallel to one another. The upper end portion 24 of the second pair of spaced apart uprights 22 is connected together by an upper cross tie member 32 and the lower end portion 26 of the second pair of spaced apart uprights 22 is connected by a lower cross tie member 34. The upper and lower cross tie members 32,34 maintain the second pair of spaced apart uprights 22 parallel to each other. An upper cross beam member 36 is connected to the upper end portion 24 of the second pair of spaced apart uprights 22. The upper cross beam member 36 is provided for connecting a plurality of lift jacks 54,56,64,68 to be hereinafter discussed, to the pair of spaced apart uprights 22. The second pair of spaced apart uprights 22 are guided for movement relative to the first pair of spaced apart uprights 12 by a plurality of rollers 38 in a conventional manner.

A carriage 40 having spaced apart upper and lower carriage plate members 42,44 and the first and second spaced apart roller brackets 46,48 which are connected to the upper and lower carriage plate members 42,44 is provided. The roller brackets 46,48 extend from the upper and lower carriage plate members 42,44 and include a plurality of rollers 50 connected thereto for guiding the carriage for elevational movement along the second pair of spaced apart uprights 22. The carriage has a pair of L shaped forks 52 which are connected to the upper and lower carriage plate members 42,44 and movable with the carriage 40. The forks 52 are mounted on the carriage 40 in such a manner so as to permit side adjustment thereof. The carriage 40 is elevationally movable along the second pair of spaced apart uprights 22 between the end portions 24,26 thereof.

First and second mast lift jacks 54,56 each having a cylinder 58 are mounted at the cylinder 58 on the first pair of uprights 12 at the lower end portion 16 thereof and extend substantially parallel to the first pair of spaced apart uprights 12. The cylinders 58 of the first and second lift jacks 54,56 each have a rod 60 connected to the cylinder 58 and extensibly movable along a longitudinal axis 62 of each of the cylinders 58 of the first and second mast lift jacks 54,56. The rods 60 of the first and second mast lift jacks 54,56 are connected to the upper cross beam member 36. Extension of the rods 60 will cause elevational movement of the first pair of spaced apart uprights 12 relative to the second pair of spaced apart uprights 22. Preferably, the first mast lift jack 54 is mounted closely adjacent one of the uprights of the first pair of spaced apart uprights 12 and the second mast lift jack 56 is mounted closely adjacent the other of the uprights of the first pair of spaced apart uprights. Therefore, the visibility of the vehicle operator will be maximized since the window defined by the space between the first pair of spaced apart uprights 12 is as at a maximum for a given vehicle size and width.

Figure 2:
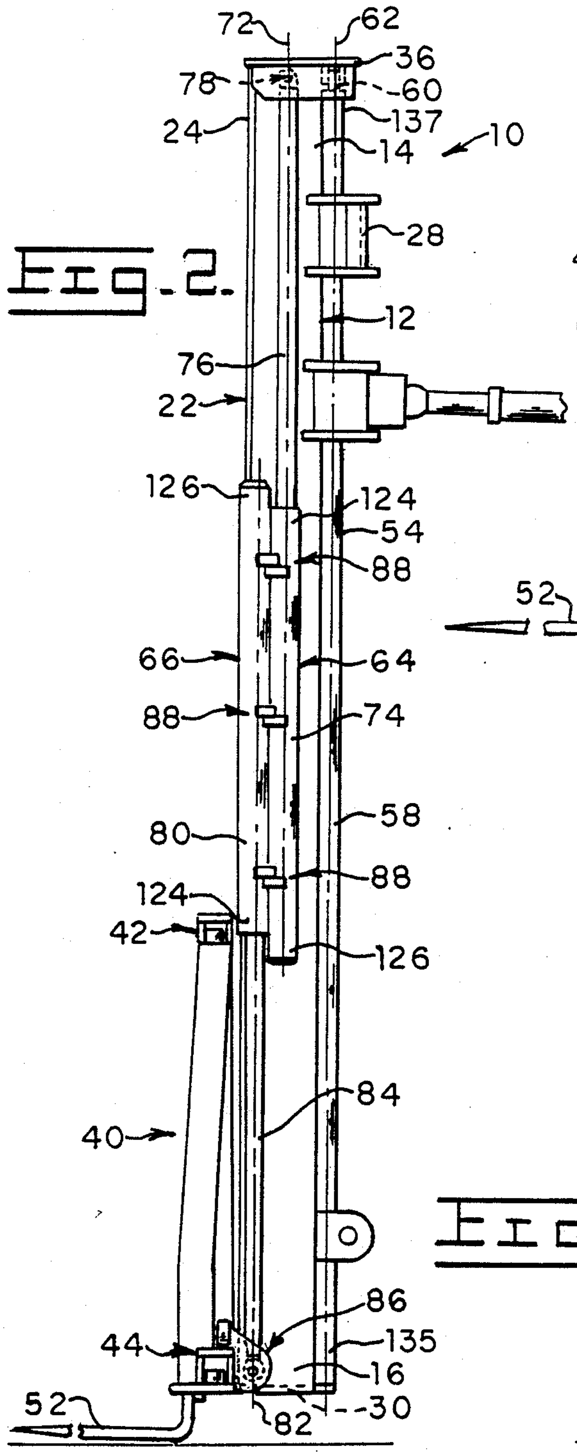
FIG. 2 is a diagrammatic side elevational view of the lift mast assembly of FIG. 1 with the carriage and second upright shown at their lowered positions.
Figure 3:
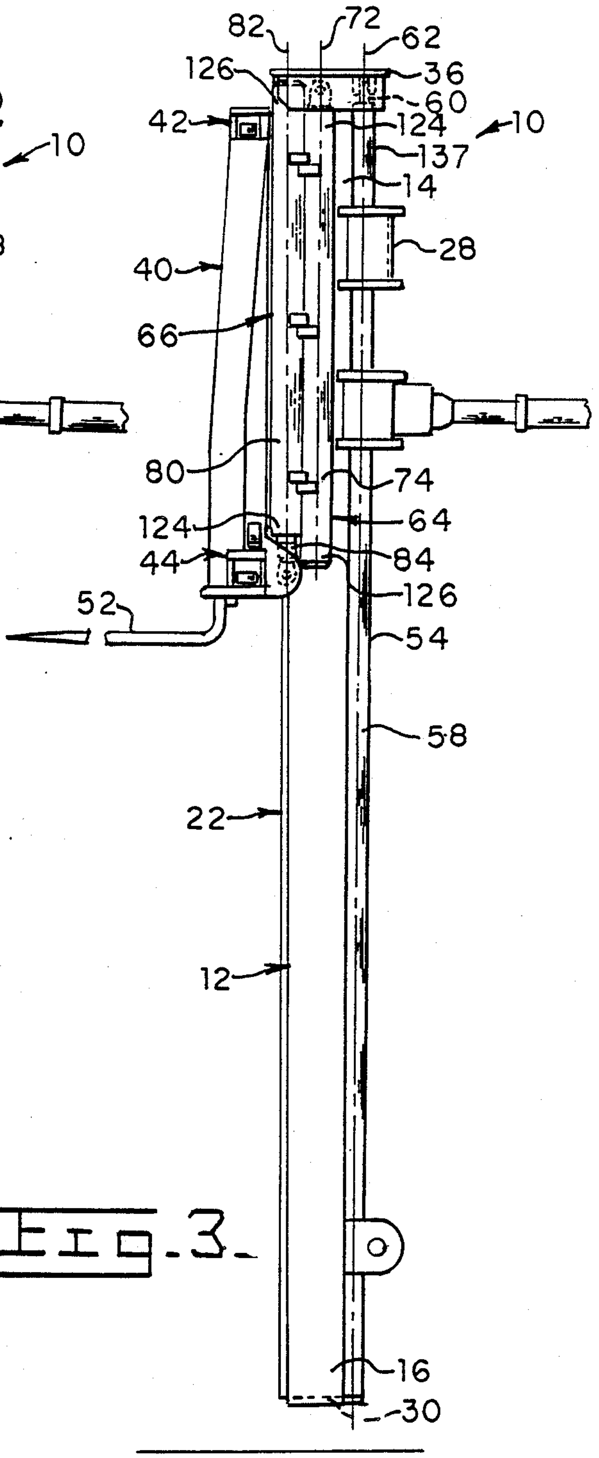
FIG. 3 is a side elevational view of the lift mast assembly of FIG. 1 showing the carriage assembly at the full free raised position adjacent the upper end portion of the second pair of uprights.
Figure 4:
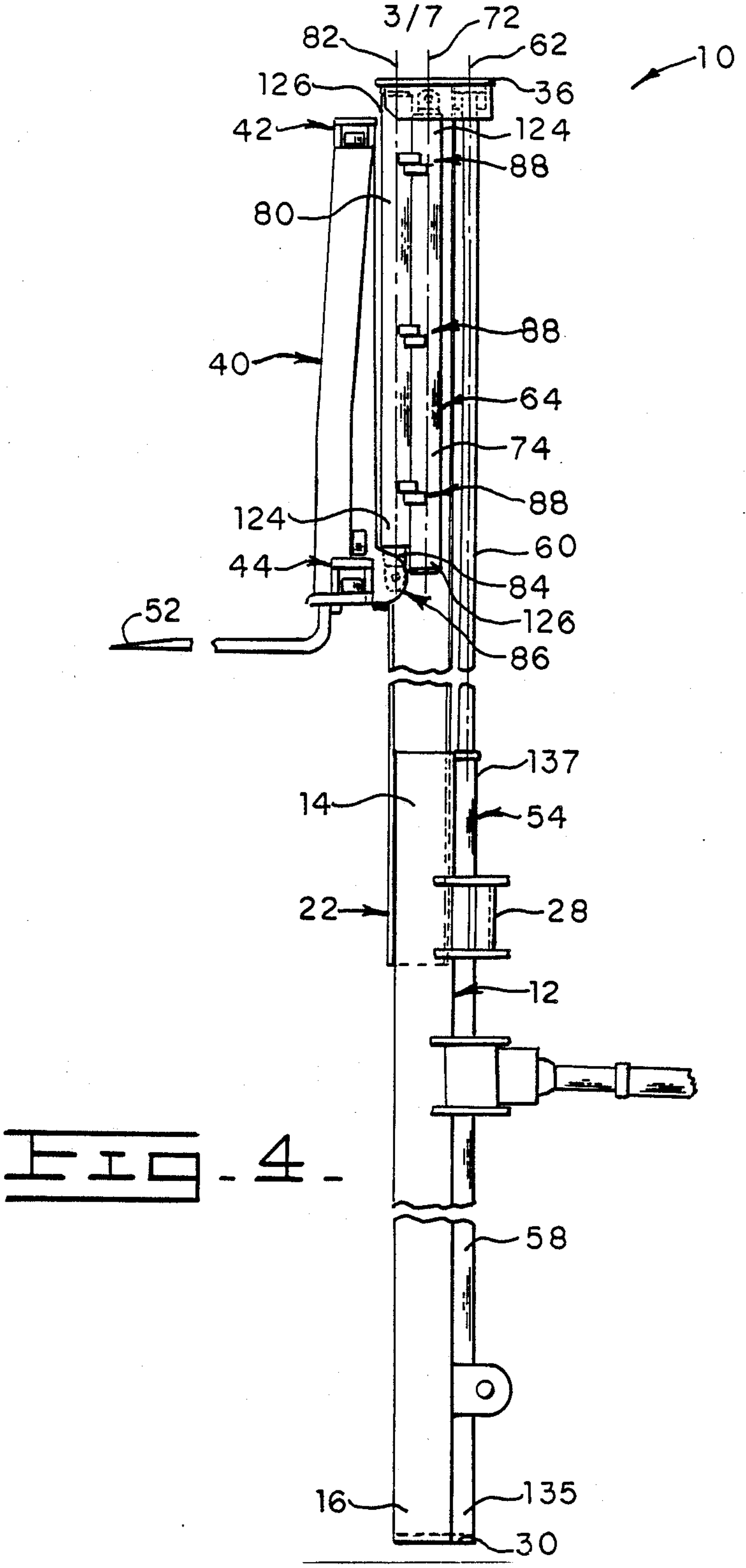
FIG. 4 is a diagrammatic side elevational view of the lift mast assembly of FIG. 1 showing the carriage at the fully raised position adjacent the upper end portion of the second pair of uprights and the second pair of uprights at the fully extended position.

First and second carriage lift jacks 64,66 and third and fourth carriage lift jacks 68,70 are provided for elevationally moving the carriage along the second pair of spaced apart uprights 22 between a lowered position as shown in FIGS. 1 and 2, wherein the carriage is adjacent the lower end portion 26 of the second pair of uprights 22, and a raised position spaced elevationally above and relative to the lower position, as shown in FIGS. 3 and 4, at which the carriage is adjacent the upper end portion 24 of the second pair of spaced apart uprights. It is to be noted that the first, second, third and fourth carriage lift jacks 64,66,68,70 provide this free lift without requiring extension of the second pair of spaced apart uprights 22 relative to the first pair of spaced apart uprights 12.

Figure 5:
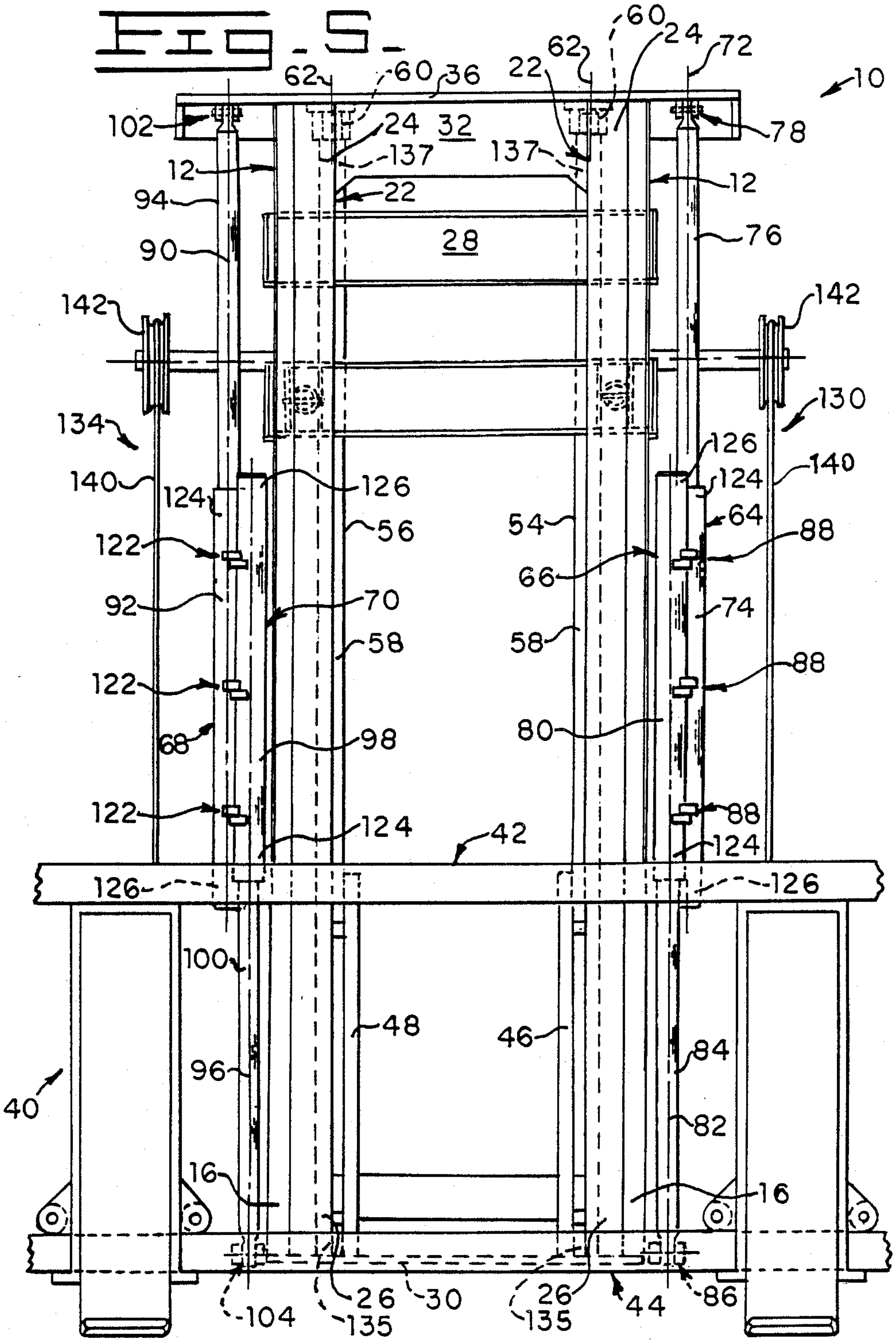
FIG. 5 is a diagrammatic front elevational view of the lift mast assembly of FIG. 1 taken along lines V—V of FIG. 1.

As best seen in FIG. 5, the first carriage lift jack 64 has a longitudinal axis 72, a tubular cylinder 74, and a rod 76 which is connected to and extensibly movable along said longitudinal axis 72 and relative to the first carriage lift jack cylinder 74. The first carriage lift jack rod 76 is pivotally connected to the upper cross beam member 36 of the second pair of spaced apart uprights 22 by a bifurcated member and pin arrangement 78 of a conventional design.

The second carriage lift jack 66 has a tubular cylinder 80, a longitudinal axis 82, and a rod 84 extensibly movable relative to the tubular cylinder 80 along the second carriage lift jack longitudinal axis 82. The rod 84 of the second carriage lift jack 66 is pivotally connected to the lower carriage plate member 44 by a bifurcated member and pin arrangement 86 of a conventional design.

Referring to FIGS. 5,6,7, and 8, a first connecting means 88 is provided for connecting the first carriage lift jack cylinder 74 to the second carriage lift jack cylinder 80 and for maintaining the first and second carriage lift jack cylinders 74 and 80 from movement relative to each other and for maintaining the longitudinal axis 72,82 of the first and second carriage lift jacks 64,66 substantially parallel to each other. It is to be noted that the cylinders 74,80 of the first and second carriage lift jacks 64,66 overlap each other a preselected amount in order that the magnitude of the combined length of stroke of the rods 76,84 is adequate to provide full free lift of the carriage 40 relative to the second pair of spaced apart uprights 22. As previously indicated full free lift of the carriage 40 requires that the carriage can move along the second pair of spaced apart uprights 22 between and to the upper and lower end portions 24,26 thereof. Therefore, the amount of overlap of the cylinders 74,80 is determined as a function of the overall extended length of the first and carriage lift jacks 64,66, the design criteria of the carriage 40 (carriage roller spacing, roller bracket length, and location of the lower carriage plate member relative to the carriage rollers), the length of the second pair of spaced apart uprights, and the location of the pivotal connection of the rods 76 and 84 to the carriage 40, and second pair of uprights 22.

The third and fourth carriage lift jacks 68,70 are constructed in a manner identical to that of the first and second carriage lift jacks 64 and 66. The third carriage lift jack has a longitudinal axis 90, a tubular cylinder 92 and a rod 94 slidably disposed in the tubular cylinder 92 and extensibly movable relative to the tubular cylinder 92 along the longitudinal axis 90. Similarly, the fourth carriage lift jack 70 has a longitudinal axis 96, a tubular cylinder 98 and a rod 100 slidably disposed in the cylinder 98 and extensible relative to the cylinder 98 along the longitudinal axis 96. A bifurcated member and pin arrangement 102 which is of a conventional design pivotally connects the rod 94 of the third carriage lift jack 68 to the upper cross beam member 36 and a bifurcated member and pin arrangement 104 which is also of a conventional design pivotally connects the rod 100 to the lower carriage plate member 44. Extension of the rods 94 and 100 of the third and fourth carriage lift jack 68,70 will move the carriage 40 to the lowered position adjacent the lower end portion 26 of the second pair of uprights and retraction of the rods 94,100 will move the carriage 40 to the raised position adjacent the upper end portion 24 of the second pair of spaced apart uprights 22. It is to be noted that the combination of the first and second and third and fourth carriage lift jacks 64,66,68,70 provide full free lift of the carriage 40 along the second pair of spaced apart uprights 22 without requiring movement of the second pair of spaced apart uprights 22. The bifurcated member and pin arrangements 78,86,102,104 allow the first and second carriage lift jacks 64,66 and the third and forth carriage lift jacks 68,70 to self center during operation which reduces the potential for side loading of the jacks 64,66,68,70. The first, second, third and fourth carriage lift jacks 64,66,68,70 may be replaced by pairs of parallel carriage lift jacks, respectively, to further reduce the potential for side loading by equally distributing and balancing the load forces.

The first connecting means 88 preferably includes a plurality of first tab members 106 which are welded to the first carriage lift jack cylinders 74 at preselected longitudinally aligned spaced apart locations along the first carriage lift jack 74. A plurality of second tab members 108 are welded to the second carriage lift jack cylinder 80 at preselected longitudinally aligned spaced apart locations along the second carriage lift jack cylinder 80. The first and second tab members 106,108 are in sequential and adjacent abutting contact with each other and provide a plurality of connections along each of the cylinders 74,80. A first fastening means 110 is provided for releasably fastening each one of the plurality of first tab members to an adjacent abutted one of each of the second tab members 108. The first fastening means 110 preferably includes a plurality of threaded fasteners 113 disposed in an apertures 111 of each of the first and second tab members 106,108 and securely connected thereto. The first and second plurality of tabs 106,108 and fastening means 110 will result in the sharing of torsional, linear, and couple loads applied to the cylinders 74,80 by each of the tabs 106,108.

The first connecting means 88 also includes a plurality of third tab members 112 which are welded to the first carriage lift jack cylinder 74 at preselected longitudinally aligned spaced apart locations along the first carriage lift jack cylinder 74. Said third tab members 112 are circumferentially spaced from the first tab members 106 on the cylinder 74 of the first carriage lift jack 64. A plurality of fourth tab members 114 are welded to the second carriage lift jack cylinder 80 at preselected longitudinally aligned spaced apart locations along the second carriage lift jack 80. The fourth tab members 114 are circumferentially spaced from the second tab members 108 on the second carriage lift jack 80. The third and fourth tab members 112,114 are in sequential aligned and butting contact with each other. A second fastening means 116 is provided for releasably fastening each one of the plurality of third tab members 112 to an adjacent abutted one of the fourth tab members 114. The second fastening means 116 preferably includes a plurality of axially aligned apertures 118 which are disposed in the third and fourth tab members 112,114. A plane 120 passing longitudinally through the apertures 111 and 118 of the first, second, third and fourth tab members 106,108,112 and 114 is preferably parallel to the longitudinal axes 72,82 first and second cylinders 74,80 and extends between the first and second cylinders 74,80. The first, second, third, and forth tab members 106,108,112, and 114, together restrain the first and second cylinders from pivotal movement about the first and second fastening means 110,116.

A second connecting means 122 is provided for connecting the cylinders 92,98 of the third and fourth carriage lift jacks 68,70 to one another and for maintaining the longitudinal axis 90,96 of the third and fourth carriage lift jacks 68,70 substantially parallel to each other and in a preselected overlapping relationship relative to each other, and for maintaining the cylinders 92,98 of the third and fourth carriage lift jacks 68,70 from movement relative to each other. The longitudinal axis 72,82,90 and 96 are preferably substantially parallel to each other so as to provide for smooth and parallel operation of the carriage 40 as it is guided along the second pair of spaced apart uprights 22. The second connecting means 122 is identical in construction to that of the first connecting means 88 and therefore, will not be discussed in any greater detail.

Figure 6:
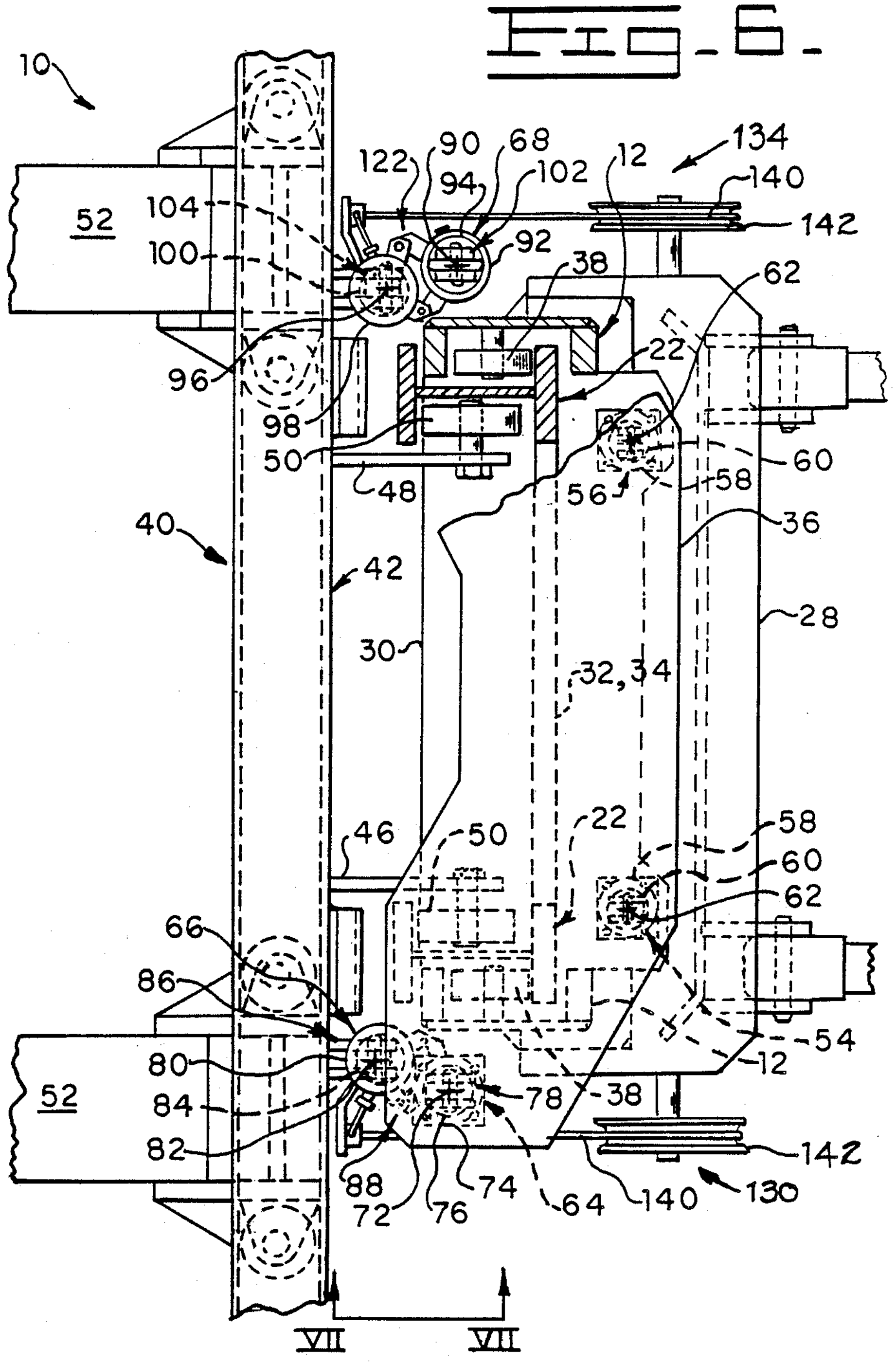
FIG. 6 is a diagrammatic partial top elevational view of the lift mast of FIG. 1.
Figure 8:
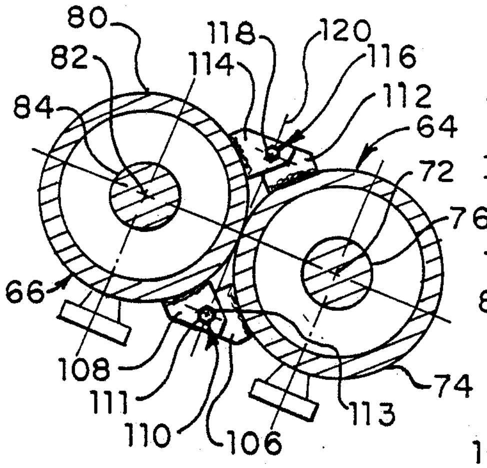
FIG. 8 is a diagrammatic view taking along lines VIII—VIII of FIG. 7 showing the first and second carriage lift jacks and associated first and second connecting means in greater detail.

As best seen in FIG. 6, the first and second carriage lift jacks 64,66 are spaced from the third and fourth carriage lift jacks 68,70 and located, relative to the first and second pairs of uprights 12,22 and window defined thereby, at positions wherein the the line of sight of the vehicle operator is not restricted by the carriage lift jacks 64,66,68,70. In the embodiment shown, the location of the first and second carriage lift jacks 64,66 is adjacent one of the uprights of the first pair of uprights 12 and the location of the third and fourth carriage lift jacks 68,70 is adjacent the other upright of the first pair of uprights 12. As previously noted, the first and second carriage lift jacks 64,66 are overlapped a preselected distance of their length in order that the combined length of the first and second carriage lift jacks 64,66 is of a magnitude sufficient to move the carriage 40 from the lowered position adjacent the lower end portion 26 of the second pair of uprights 22, when the rods 76,78 are extended, to the raised position adjacent the upper end portion 24 of the second pair of uprights 22, when the rods 76,78 are retracted. The overlap provided on the cylinders 92,98 of the third and fourth carriage lift jacks 68,70 is identical to that of the first and second carriage lift jacks 64,66 so that the combined extended length of the third and fourth carriage lift jacks 68,70 is of a magnitude sufficient to move the carriage 40 from a lowered position adjacent the lower end portion 26 of the second pair of uprights 22, with the rods 94,100 extended to a raised position adjacent the upper end portion 24 of the second pair of spaced apart uprights 22, with the rods 94,100 retracted. Through examination of the drawings of FIGS. 5 and 6, it should be recognized that the first and third carriage lift jack rods 76,94 extend from the cylinders 74,92, respectively, in the same and an upward direction relative to the uprights 12,22, and the second and fourth carriage lift jack rods 84,100 extend from the cylinders 80,98 in the same and a downward direction from the cylinders 80,98. Thus, the first and second rods 76,84 extend in opposite directions from each other and the third and fourth rods 94,100 extend in opposite directions relative to each other.

Figure 7:
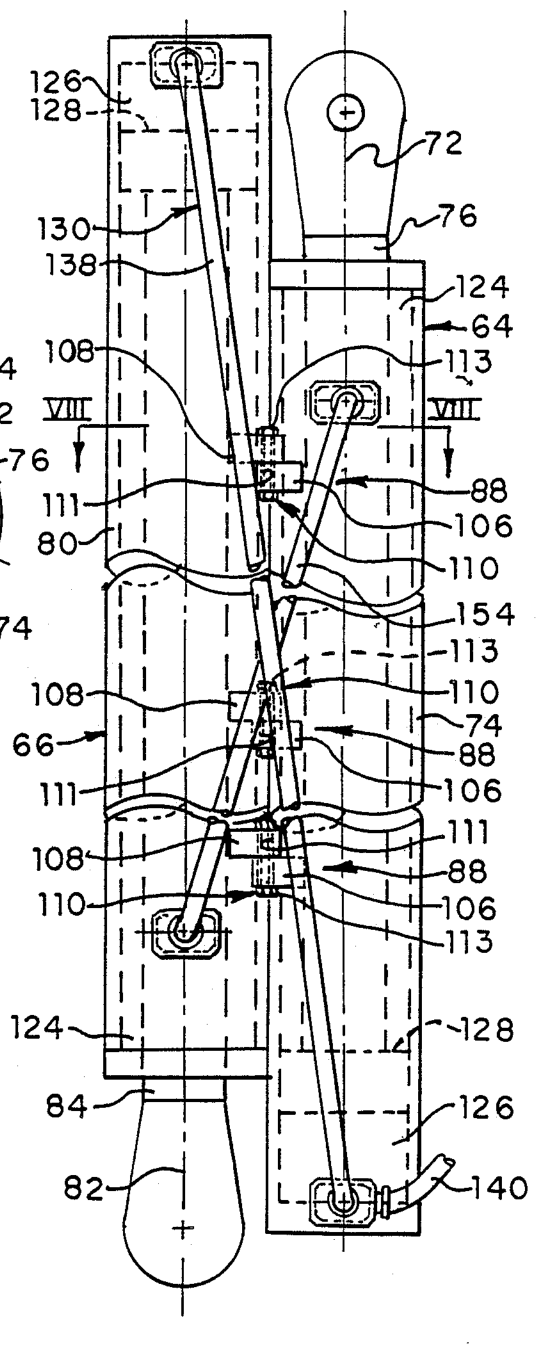
FIG. 7 is a diagrammatic enlarged partial view of the first and second carriage lift jacks of FIG. 1 showing the first connecting means in greater detail.
Figure 9:
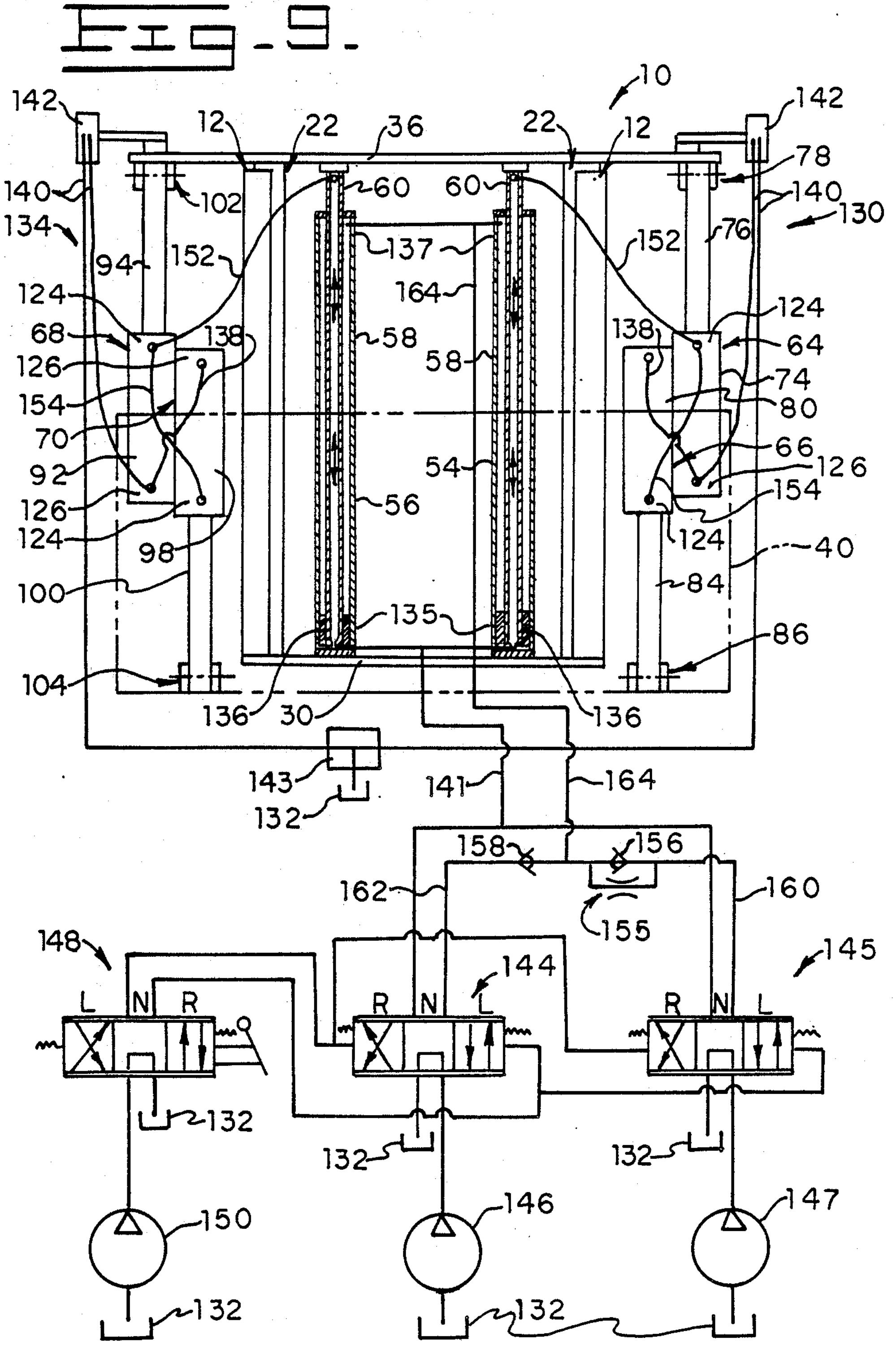
FIG. 9 is a diagrammatic schematic showing the fluid system utilized drain the carriage lift jacks and to fluid operate the carriage and mast lift jacks.

The cylinders 74,80,92,98 of the carriage lift jacks 64,66,68,70, respectively, each have a rod end portion 124, a head end portion 126, and a piston 128, connected to each of the rods 76,84,94 and 100. As best seen in FIGS. 7 and 9, a first passage means 130 is provided for interconnecting the head end portions 126 of the first and second carriage lift jack cylinders 74,80 to each other and for passing leakage fluid from the head end portions 126 of the first and second carriage lift jack cylinders 74,80 to a reservoir 132. In an identical manner, a second passage means 134 is provided for interconnecting the head end portions of the third and fourth carriage lift jacks cylinders 92,98 to each other and for passing leakage fluid from the head ends 126 of the third and fourth carriage lift jack cylinders 92,98 to the reservoir 132. By providing a drainage path for leakage fluid from the head ends of the first, second, third and fourth lift jacks 64,66,68,70 the sequence of operation, the length of stroke, and the general quality of operation of the first and second and third and fourth carriage lift jacks 64,66,68 and 70 may be maintained. Therefore, movement of the carriage 40 along the second pair of uprights 22 will be smooth and even and the possibility of carriage cocking and improper carriage and carriage lift jack loading will be substantially reduced.

Referring to FIG. 9, each of the first and second mast lift jacks 54,56 have a piston 136 slidably disposed in the cylinder 58 and connected to the rod 60. The pistons 136 of the first and second mast lift jacks 54,56 each have a cross sectional diameter which is smaller in magnitude than the diameters of the pistons 128 of any one of the first, second, third and fourth carriage lift jacks 64,66,68 and 70. Therefore, the carriage lift jacks 64,66,68 and 70 will extend to lift the carriage 40 prior to extension of the mast lift jacks 54,56 to raise the second pair of uprights 22. Preferably the diameter of the piston 128 of the first, second, third and fourth carriage lift jacks 64,66,68,70 are equal in magnitude. The second and fourth carriage lift jacks 66,68 will retract to raise the carriage 40 prior to retraction of the first and third carriage lift jacks 64,68 since the first and third carriage lift jacks 64,68 must lift not only the weight of the carriage but also the additional weight of itself and the second and fourth carriage lift jacks 66,70. Therefore, raising of the carriage 40 will precede the raising of the second pair of uprights 22.

The first and second passage means 130,134 include conduit assemblies 138 which pass drain fluid between the head ends 126. Flexible hoses 140 which are wound on a spool assemblies 142 deliver the drain fluid from the head ends 126 to a junction box 143 which tees the flexible hoses 140 to the reservoir 132. It is to be noted that the first, second, third, and fourth carriage lift jacks 64,66,68,70 are single acting. Thus, these hoses 140 are not pressurized in order to extend the rods 76,84,94,100, gravity aocomplishes this.

With reference to FIG. 9, first and second, closed center, infinitely variable, spring biased to neutral "N", pilot operated control valves 144,145 are provided to direct fluid flow between a source of pressurized fluid, such as first and second pumps 146,147 and the head end portions 135 of the first and second mast lift jacks 54,56, by conduit 141 and between the head end portions 135 of the first and second mast lift jacks 54,56 and the reservoir 132 by conduit 164. The first and second pilot operated control valves are shiftable between raise "R", at which pressurized fluid flow is delivered from a source of pressurized fluid such as pumps 146,147 to the head end portion 135 of the mast lift jacks 54,56, and lower "L", at which fluid flow in the first and second lift jacks 54,56 is directed to the reservoir 132 from the head end portion 135 of the mast lift jacks 54,56. A spring centered neutral "N", infinitely variable, pilot valve 148, which is manually shiftable between raise "R" and lower "L" positions is provided for selectively delivering pressurized fluid flow from a pilot pump 150 and shifting the first and second pilot operated control valves 144,145 between their raise "R" and lower "L" positions.

The rods 60 of the first and second mast lift jacks 54,56 are ported, so that fluid at the head end portion 135 of the first and second mast lift jacks 54,56 is communicated along an axial passage in each of the rods 60 and in fluid communication with the rod end portions 124 of a respective one of the first and third carriage lift jack cylinders 74,92, by flexible conduits 152. The rod ends 124 of the cylinders 74,92 of the first and third lift jacks 64,68 are in fluid communication connection with the rod ends 124 of the cylinders 80,98, respectively, of the second and fourth carriage lift jacks 66,70 by conduits 154. Therefore, fluid directed by the first and second pilot operated control valves 144,145 will pass through the ported rods 60 of the first and second mast lift jacks 54,56, the conduits 152,154 and between the rod ends 124 of the first and third carriage lift jacks 64,68 and the first and second pumps 146,147 and reservoir 132 as determined by the position of the pilot operated control valves 144,145.

As previously discussed and due to the relative sizing of the various pistons 128,136 the sequencing as aforementioned will cause the first and third carriage lift jacks 64,68 to extend first, then the second and fourth carriage lift jacks 66,70, and finally the first and second mast lift jacks 54,56. To lower the lift mast assembly 10 from the fully extended position as shown in FIG. 4, the pilot control valve is shifted to the lowered position "L". Fluid is then passed from the rod ends 124 of the first, second, third and fourth carriage lift jacks 64,66,68 and 70 and from the head end portions 135 of the first and second mast lift jacks 54,56 to reservoir 132. Thus, lowering of the first and second pairs of spaced apart uprights 22 and the carriage 40 will occur as this happens.

A choke 155, in the form of a fixed orifice, and first and second check valves 156, 158 are provided as a design alternative in situations where the space available on the lift mast assembly 10 does not allow the difference of the diameters of the pistons 136,128 to be great enough in magnitude to accomplish the desired jack sequencing. The choke 155, and check 156 are disposed in a first branch conduit 160 and the check 156 is disposed in a second branch conduit 162 of conduit 164. Conduit 164 is connected to the rod end 137 of the mast lift jack cylinders 58, the first branch conduit is connected to the second control valve 145 and the second branch conduit 162 is connected to the first control valve 144. The choke 155, and checks 156,158 maintain a preselected amount of back pressure in the rod ends 137 (between the piston rod end side, cylinder wall, and cylinder rod end caps) of the cylinders 58 of the lift cylinders 54,56 during extension of the mast lift jacks 54,56 so that the proper sequencing may be maintained. With the first and second control valves 144,145 shifted to the raise positions "R", fluid flow is delivered to the head ends 135 of the first and second mast lift cylinders 54,56 to extend the rods 60 therefrom. The fluid in the rod ends 137 of the cylinders 58 is directed by conduits 164,160 and 162 toward the first and second control valves 144,145. The checks 156,158 prevent the fluid from flowing to the first and second control valves 144,145 and forces the flow through the restriction defined by the choke 155, through the second control valve 145, and to the reservoir 132. As a result of the difference in sizing of the carriage and mast lift jack pistons 128,136 and the restriction provided by the choke 155, the carriage lift jacks 64,66,68,70 will extend prior to any extension of the mast lift jacks 54,56 and provide for full free lift of the carriage 40 before any extension of the second uprights 22.

Industrial Applicability

With reference to the drawings, and particularly FIGS. 1-4, the full free lift mast assembly 10 is suitable for elevationally positioning a load relative to the vehicle 20 upon which the full free lift mast assembly 10 is pivotally mounted. As shown in FIG. 2, the carriage 40 is at the lowered position adjacent the lower end portion 26 of the second pair of uprights 22. At this lowered position the forks 52 ar adjacent an underlying vehicle supporting surface and suitable for picking up a palletized load (not shown) supported on the underlying surface. The vehicle 20 is then properly positioned so that the forks 52 are at a location adjacent the load and aligned with the load so that the forks 52 are positioned beneath the load to be lifted. Upon completion of this maneuver the pilot control valve 148 will be shifted by the vehicle operator to the "R" position to raise the load. This manipulation will cause shifting of the pilot control valves 144,145 to the raised positions "R". Pressurized fluid flow will be directed by the pilot operated control valves 144,145 from the pumps 146,147, respectively, to the head ends 135 of the first and second mast lift jacks 54,56. The fluid delivered to the head ends 135 of the mast lift cylinders 58 will pass up the ported rods 60 and by conduits 152 to the first, second, third, and fourth lift jacks 64,66,68, and 70. Due to the differences in the areas of the pistons 130 the pressurized fluid will cause actuation of the carriage lift jacks 64,66,68,70 first. It is to be noted that when the choke 155 and checks 156,158 are provided, it is assured that the sequence of operation of the lift jacks will occur.

Actuation of the first and second control valves 144,145, as discussed above, will result in retraction of rods 84 and 100 of the second and fourth carriage lift jacks 54,56 first and elevational movement of the carriage 40 toward the upper end portion 24 of the second pair of spaced apart uprights 22. Upon complete retraction of the rods 84,100 of the second and fourth carriage lift jacks 66,70, fluid pressure will increase and the first and third carriage lift jacks 64,68 will be actuated and the rods 76,94 retracted. The reason for this sequencing, as previously discussed, is due to the fact that the first and third carriage lift jacks 64,68 must, in addition to lifting the weight of the carriage 40 and the load carried thereby, lift the weight of the second and fourth lift jacks 66,70. The fluid pressure acting against the pistons 128 will cause the first, second, third and fourth carriage lift jacks 64,66,68 and 70 to retract and raise the carriage 40 to the uppermost position (FIG. 3) adjacent the upper end portion 24 of the second spaced apart uprights 22. This is achieved without requiring any extension of the second pair of uprights 22 relative to the first pair of uprights 12.

After the rods 76,84,94,100, of the first, second, third and fourth carriage lift jacks 64,66,68,70 are fully retracted the pressure in the system will build to a level capable of causing extension of the rods 60 of the first and second mast lift jacks 54,56. This pressure will act on the pistons 136 which will result in extension of the rods 60 and elevational movement of the first pair of spaced apart uprights 12 relative to the second pair of spaced apart uprights 22. Since the carriage lift jacks 64,66,68,70 are connected to the carriage 40 and upper cross beam 36 of the second pair of spaced apart uprights 22, the carriage 40 will remain adjacent the upper end portion 24 of the second pair of uprights 22 and move with the second pair of uprights relative to the first pair of uprights 12. Upon completion of the maximum amount of extension of the rods 60 of the first and second mast lift jacks 54,56 full extension of the second pair of uprights 22 relative to the first pair of uprights 12 will have been completed. Since the carriage moves with the second pair of uprights 22 during extension thereof, the maximum overall extended height of the carriage 40 relative to the first pair of uprights 12 results.

To lower the carriage 40 and second pair of uprights from the fully raised position as shown in FIG. 4, the operator simply shifts the pilot valve valve 148 to the lower position "L" which shifts the first and second control valves 144,145 to their lower positions "L". This will result in fluid in the jacks 54,56,64,66,68 and 70 being directed by the first and second control valves 144,145 to the reservoir 132 and extension of the first, second, third and fourth carriage lift jacks 64,66,68,70 and retraction of the first and second mast lift jacks 54,56. Thus, the carriage 40 and second pair of uprights 22 will lower as a result of this operation.

Since the first and second carriage lift jacks 64,66, and the third and fourth carriage lift jacks 68,70 are pivotally connected to the upper cross beam member 36 and the lower carriage plate member 44, as earlier described, the first, second, third and fourth carriage lift jacks 64,66,68,70 will be able to self center. This will reduce the potential for side loading of the first, second, third and fourth lift jacks 64,66,68 and 70 and result in reduced fluid leakage and premature ware of the carriage lift jacks 64,66,68,70.

The first connecting means 88 will further improve the life of the first and second carriage lift jacks 64,66 by maintaining the axes 72,82 parallel to each other and thereby resist buckling, bending and the like. The first connecting means also maintains the first and second carriage lift jack cylinders 74,80 at a proper overlapped relationship relative to each other so that the amount of extension of the first and second carriage lift jack rods 76,84 is adequate to enable full free lift of the carriage 40.

The second connecting means 122 is identical in constriction to that of the first connecting means 88 and will achieve identical results as that of the first connecting means 88 by maintaining the third and fourth carriage lift jacks axes 90,96 parallel to each other and maintaining the proper amount of longitudinal overlap of the third and fourth carriage lift jack cylinders 92,98 so that full free movement of the carriage 40 is permitted.

To ensure that full extension and retraction of the first, second, third and fourth carriage lift jack rods 76,84,94 and 100 is available the second passage means 134 is provided for draining leakage fluid from the head end portions 126 of the carriage lift jacks 64,66,68 and 70. The second passage means 134 interconnects the head end portions 126 of the first, second, third and fourth lift jacks 64,66,68,70 with the drain. The spool assemblies 142 take up any slack in the hose 140 as the carriage 40 moves along the second pair of uprights 22.

Thus, it can be seen that the embodiment of the invention described herein provides a full free lift mast assembly that reduces or eliminates the problems herein discussed in a simple, economical, and efficient manner.

Other aspects, objects and advantages of this invention can be obtained from a study of the drawings, the disclosure, and the appended claims.

What is claimed:

1. A full free lift mast assembly, comprising:
a first pair of spaced apart fixed uprights;
a second pair of spaced uprights movably mounted on said first pair of uprights;
a carriage movably mounted on said second pair of uprights;
a first mast lift jack having a cylinder and a rod connected to and extensibly movable relative to said cylinder, said rod being connected to one of said first pair of fixed and said second pair of movable uprights and said cylinder being connected to the other of said first pair of fixed and said second pair of movable uprights;

a first carriage lift jack having a longitudinal axis, a cylinder, and a rod connected to and extensibly movable along said first carriage lift jack longitudinal axis and relative to said first carriage lift jack cylinder, said first carriage lift jack rod being pivotally connected to one of said carriage and said second pair of uprights;

a second carriage lift jack having a cylinder, a longitudinal axis, and a rod connected to and extensibly movable relative to the second carriage lift jack cylinder along the second carriage lift jack longitudinal axis, said second lift jack rod being pivotally connected to the other of said carriage and second uprights; and first connecting means for connecting said first carriage lift jack cylinder to the second carriage lift jack cylinder, for maintaining said first and second carriage lift jack cylinders from movement relative to each other and in a preselected overlapping relationship relative to each other, and for maintaining the longitudinal axis of said first and second carriage lift jacks substantially parallel to each other, said first connecting means including:

a plurality of first tab members connected to said first carriage lift jack cylinder at preselected longitudinally aligned spaced apart locations along the first carriage lift jack cylinder;

a plurality of second tab members connected to the second carriage lift jack cylinder at preselected longitudinally aligned spaced apart locations along the second carriage lift jack cylinder, said first and second tab members being in sequential and adjacent abutting contact with each other, and first fastening means for releasably fastening each one of the plurality of first tab members to an adjacent abutted one of the second tab members.

2. A full free lift mast assembly, as set forth in claim 1, wherein said first connecting means includes;

a plurality of third tab members connected to the cylinder of the first carriage lift jack at preselected longitudinally aligned spaced apart locations along the first carriage lift jack cylinder, said third tab members being circumferentially spaced from said first tab members on said first carriage lift jack cylinder, and a plurality of fourth tab members connected to the cylinder of the second carriage lift jack at preselected longitudinally aligned spaced apart locations along the second carriage lift jack cylinder, said fourth tab members being circumferentially spaced from said second tab members on the second carriage lift jack cylinder, said third and fourth tab members being in sequential aligned and abutting contact with each other, and second fastening means for releasably fastening each one of the plurality of third tab members to an adjacent abutted one of the fourth tab members.

3. A full free lift mast assembly, as set forth in claim 1, wherein said second pair of uprights has upper and lower end portions and wherein said first and second carriage lift jacks each have a preselected extended length and a total combined extended length, said total combined length being a function of the preselected extended length of each of the first and second carriage lift jacks less a preselected amount of longitudinally axial overlap of the cylinders of the first and second carriage lift jacks, said combined length of the first and carriage lift jacks being of a magnitude sufficient to move the carriage from a location adjacent the lower end of the second pair of uprights to a location adjacent the upper end portion of the second pair of uprights.

4. A full free lift mast assembly, as set forth in claim 1, wherein the rods of said first and second carriage lift jacks extend from said first and second carriage lift jack cylinders in opposite directions.

5. A full free lift mast assembly, as set forth in claim 1, wherein said second pair of uprights each have an upper end portion, and including an upper cross beam member connected to and between the upper end portion of each of said second pair of uprights, said first carriage lift jack rod being pivotally connected to said upper cross beam member.

6. A full freelift mast assembly, as set forth in claim 3, wherein said carriage has a lower carriage plate member, said second carriage lift jack rod being pivotally connected to the lower carriage plate member.

7. A full free lift mast assembly, comprising:

a first pair of speed apart fixed uprights;

a second pair of spaced uprights movably mounted on said first pair of uprights;

a carriage movably mounted on said second pair of uprights;

a first mast lift jack having a cylinder, a rod connected to and extensibly movable relative to said cylinder and a piston connected to the rod, said rod being connected to one of said first pair of fixed and said second pair of movable uprights and said cylinder being connected to the other of said first pair of fixed and said second pair of movable uprights;

a first carriage lift jack having a longitudinal axis, a cylinder, and a rod connected to and extensibly movable along said first carriage lift jack longitudinal axis and relative to said first carriage lift jack cylinder, said first carriage lift jack rod being pivotally connected to one of said carriage and said second pair of uprights;

a second carriage lift jack having a cylinder, a longitudinal axis, and a rod connected to and extensibly movable relative to the second carriage lift jack cylinder along the second carriage lift jack longitudinal axis, said second lift jack rod being pivotally connected to the other of said carriage and second uprights, said first and second carriage lift jacks each having a piston connected to each of the first and second carriage lift jack rods, said pistons each having a preselected diameter defining an effective area against which fluid pressure operates, said diameter of the piston of the first mast lift jack being smaller in magnitude than the diameter of the pistons of either of the first and second carriage lift jacks;

first connecting means for connecting said first carriage lift jack cylinder to the second carriage lift jack cylinder and for maintaining said first and second carriage lift jack cylinders from movement relative to each other, in a preselected overlapping relationship relative to each other, and for maintaining the longitudinal axis of said first and second carriage lift jacks substantially parallel to each other;

a reservoir;

a first branch conduit connected to the rod end portion of the first mast lift cylinder and a control valve;

a first check valve disposed in the first branch conduit and blocking fluid flow from passing from the rod end portion of the first mast lift jack to said control valve; and an orifice connected to said first branch conduit and in parallel fluid bypass with said first check valve, said orifice passing fluid flow at a restricted flow rate from said first mast lift jack to said control valve, said second control valve being shiftable to a lower position "L" at which fluid passed by said orifice is passable to said reservoir.

8. A full free lift mast assembly, comprising:

a first pair of spaced apart fixed uprights;

a second pair of spaced uprights movably mounted on said first pair of uprights;

a carriage movably mounted on said second pair of uprights;

a first mast lift jack having a cylinder and a rod connected to and extensibly movable relative to said cylinder said rod being connected to one of said first pair of fixed and said second pair of movable uprights and said cylinder being connected to the other of said first pair of fixed and said second pair of movable uprights;

a first carriage lift jack having a longitudinal axis, a cylinder, and a rod connected to and extensibly movable along said first carriage lift jack longitudinal axis and relative to said first carriage lift jack cylinder, said first carriage lift jack rod being pivotally connected to one of said carriage and said second pair of uprights;

a second carriage lift jack having a cylinder, a longitudinal axis, and a rod connected to and extensibly movable relative to the second carriage lift jack cylinder along the second carriage lift jack longitudinal cylinder, said second lift jack rod being pivotally connected to the other of said carriage and second uprights; and first connecting means for connecting said first carriage lift jack cylinder to the second carriage lift jack cylinder and for maintaining said first and second carriage lift jack cylinders from movement relative to each other, in a preselected overlapping relationship relative to each other, and for maintaining the longitudinal axis of said first and second carriage lift jacks substantially parallel to each other;

a reservoir;

a control valve having a lower position "L" and being connected to said reservoir;

a first branch conduit connected to the rod end portion of the first mast lift cylinder and said control valve;

a first check valve disposed in the branch conduit and blocking fluid flow from passing from the rod end portion of the first mast lift cylinder to said control valve; and an orifice connected to said first branch conduit and in parallel fluid bypass with said first check valve, said orifice passing fluid flow at a restricted flow rate from said first mast lift cylinder rod end portion to said control valve, said control valve being shiftable to said lower position "L" at which fluid passed by said orifice is passable by said control valve to said reservoir.

9. A full free lift mast assembly having first and second pairs of spaced apart uprights, said second pair of uprights being mounted on said first pair of uprights and guided by said first pair of uprights for extensible movement relative thereto, and a carriage mounted on said second pair of uprights and guided by said second pair of uprights for movement along said second pair of uprights, comprising:

a first pair of mast lift jacks each having a rod and a cylinder and each being connected at the rod to the second pair of uprights and at the cylinder to the first pair of uprights, said first pair of mast lift jacks being spaced apart and each mast lift jack being located adjacent a respective upright of said second pair of uprights;

a first carriage lift jack having a longitudinal axis, a cylinder, and a rod slidably connected to said first carriage lift jack cylinder and extensible relative to said first carriage lift jack cylinder along said longitudinal axis, said first carriage lift jack rod being pivotally connected to the second pair of uprights;

a second carriage lift jack having a longitudinal axis, a cylinder, and a rod slidably connected to the second carriage lift jack cylinder and extensible relative to said second carriage lift jack cylinder along said second carriage lift jack longitudinal axis, said second carriage lift jack rod being pivotally connected to the carriage;

first connecting means for connecting the first and second carriage lift jack cylinders to each other and maintaining the longitudinal axes of each of said first and second carriage lift jacks substantially parallel to each other, in a preselected overlapping relationship relative to each other, and for maintaining the cylinders of said first and second carriage lift jacks from movement relative to each other;

a third carriage lift jack having a longitudinal axis, a cylinder, and a rod slidably connected to said third carriage lift jack cylinder and extensibly movable relative to said third carriage lift jack cylinder along said third carriage lift jack longitudinal axis, said rod of the third carriage lift jack being pivotally connected to the second pair of uprights;

a fourth carriage lift jack having a longitudinal axis, a cylinder, and a rod connected to the fourth carriage lift jack cylinder and extensible relative to said fourth carriage lift jack cylinder along the longitudinal axis of said fourth carriage lift jack, said rod of the fourth carriage lift jack being pivotally connected to the carriage;

second connecting means for connecting the cylinders of the third and fourth carriage lift jacks to one another and maintaining the longitudinal axes of said third and fourth carriage lift jacks substantially parallel to each other, in a preselected overlapping relationship relative to each other, and for maintaining the cylinders of said third and fourth carriage lift jacks from movement relative to each other, said first and second carriage lift jacks being spaced from said third and fourth carriage lift jacks, said first and second carriage lift jacks being located adjacent one of the uprights of the second pair of uprights and said third and fourth carriage lift jacks being located adjacent the other upright of the second pair of uprights; said first connecting means including:

a plurality of first tab members connected to said first carriage lift jack cylinder at preselected longitudinally aligned spaced apart locations along the cylinder of said first carriage lift jack and a plurality of second tab members connected to the cylinder of the second carriage lift jack at preselected longitudinally aligned spaced apart locations along the cylinder of the second carriage lift jack, said first and second tab members being in sequential abutting contact with each other;

a first fastening means for releasably fastening the abutted first and second tab members to each other;

a plurality of third tab members connected to the first carriage lift jack cylinder at preselected longitudinally aligned spaced apart locations along the cylinder of the first carriage lift jack, said third tab members being circumferentially spaced from said first tab members on the first carriage lift jack cylinder; and a plurality of fourth tab members connected to the second carriage lift jack cylinder at preselected longitudinally aligned spaced apart locations along the second carriage lift jack cylinder, said fourth tab members being circumferentially spaced from said second tab members on the second carriage lift jack cylinder, said third and fourth tab members being in sequential abutting contact with each other; and a second fastening means for releasably fastening the abutted third and fourth tab members to each other.

* * * * *

UNITED STATES PATENT AND TRADEMARK OFFICE
CERTIFICATE OF CORRECTION

PATENT NO. : 4,896,748

DATED : January 30, 1990

INVENTOR(S) : Jan Mikkelsen and Kjell Sorlie

It is certified that error appears in the above-identified patent and that said Letters Patent is hereby corrected as shown below:

Claim 7, column 14, line 22, change "speed" to --spaced--.

Claim 7, column 15, line 9, delete "second".

Signed and Sealed this

Eleventh Day of December, 1990

*Attest:*

HARRY F. MANBECK, JR.

*Attesting Officer* *Commissioner of Patents and Trademarks*